US012110187B2

(12) United States Patent
Mukai (10) Patent No.: US 12,110,187 B2
(45) Date of Patent: Oct. 8, 2024

(54) CONVEYANCE DEVICE

(71) Applicant: YAMAHA HATSUDOKI KABUSHIKI KAISHA, Iwata (JP)

(72) Inventor: Masayuki Mukai, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 164 days.

(21) Appl. No.: 17/784,306

(22) PCT Filed: Dec. 17, 2019

(86) PCT No.: PCT/JP2019/049310
§ 371 (c)(1),
(2) Date: Jun. 10, 2022

(87) PCT Pub. No.: WO2021/124430
PCT Pub. Date: Jun. 24, 2021

(65) Prior Publication Data
US 2023/0135278 A1    May 4, 2023

(51) Int. Cl.
*B65G 43/00* (2006.01)
*B65G 54/02* (2006.01)

(52) U.S. Cl.
CPC ............. *B65G 43/00* (2013.01); *B65G 54/02* (2013.01); *B65G 2203/0266* (2013.01); *B65G 2207/30* (2013.01)

(58) Field of Classification Search
CPC ............... B65G 43/00; B65G 54/02; B65G 2203/0266; B65G 2207/30
See application file for complete search history.

(56) References Cited

U.S. PATENT DOCUMENTS

| | | | | |
|---|---|---|---|---|
| 9,008,831 B1* | 4/2015 | Jacobs | ............... | B65G 47/52 |
| | | | | 700/214 |
| 9,505,560 B2* | 11/2016 | Kleinikkink | ......... | G05B 19/414 |
| 9,525,331 B2* | 12/2016 | Mukai | ................. | H02K 11/215 |
| 10,118,775 B2 | 11/2018 | Walter et al. | | |
| 10,261,491 B1* | 4/2019 | Dunham | ............. | G05B 19/298 |
| 10,432,117 B1* | 10/2019 | Huang | ................. | H02P 7/025 |
| 10,914,620 B2* | 2/2021 | Huang | ................ | G01D 18/006 |

(Continued)

FOREIGN PATENT DOCUMENTS

CN        109690928 A     4/2019
DE     20 2015 000 059 U1  2/2015

(Continued)

OTHER PUBLICATIONS

International Search Report issued in PCT/JP2019/049310; mailed Mar. 3, 2020.

(Continued)

*Primary Examiner* — Mark A Deuble
(74) *Attorney, Agent, or Firm* — Studebaker & Brackett PC (57) ABSTRACT

A conveyance device includes a slider, a conveyor including a plurality of conveyance modules to convey the slider, and a connecting member provided separately from the conveyance modules and configured to connect the conveyance modules adjacent to each other such that a signal is transmittable. The conveyance device further includes a first indicator provided so as to correspond to each of the plurality of conveyance modules and configured to indicate states of the conveyance modules.

19 Claims, 3 Drawing Sheets

(56) References Cited

U.S. PATENT DOCUMENTS

| | | | |
|---|---|---|---|
| 10,985,685 B1* | 4/2021 | Sun | H02P 25/064 |
| 11,767,174 B2* | 9/2023 | Das | B65G 43/00 |
| | | | 198/502.3 |
| 2014/0292112 A1 | 10/2014 | Mukai | |
| 2019/0202639 A1 | 7/2019 | Mukai | |

FOREIGN PATENT DOCUMENTS

| | | |
|---|---|---|
| JP | H03-192013 A | 8/1991 |
| JP | H06-32451 A | 2/1994 |
| WO | 2013/065236 A1 | 5/2013 |
| WO | 2018/055720 A1 | 3/2018 |

OTHER PUBLICATIONS

Written Opinion issued in PCT/JP2019/049310; mailed Mar. 3, 2020.

An Office Action mailed by China National Intellectual Property Administration on Mar. 21, 2024, which corresponds to Chinese Patent Application No. 201980102998.7 and is related to U.S. Appl. No. 17/784,306; with English language translation.

An Office Action issued by the German Patent and Trademark Office on Jul. 15, 2024, which corresponds to German Patent Application No. 112019007866.6 and is related to U.S. Appl. No. 17/784,306; with English language translation.

An Office Action; "Notice of Reasons for Revocation," mailed by the Japanese Patent Office on Sep. 25, 2023, which corresponds to Japanese Patent Application No. 2021-565190 and is related to U.S. Appl. No. 17/784,306; with English language translation.

Rockwell Automation, "iTRAK System with Bearings User Manual" (2198 T-UM002 C-JA-P), Mar. 15, 2019, total 12 pages; with the translation of the JP Office Action dated Sep. 25, 2023 as a concise explanation of the relevance submitted herewith.

Beckhoff Automation, "extended Tranport System Start-Up", Ver. 1.2, Feb. 18, 2016, total 45 pages.

Beckhoff Automation, "EN Houdijk Holland: Flex Skipper stack feeding machine for biscuits", Vimeo video, May 9, 2017, total 2 pages, https://vimeo.com/216679570.

Rockwell Automation, "Independent Type Move Cart Technology" brochure 5, Nov. 1, 2015, p. 14, total 18 pages; with the translation of the JP Office Action dated Sep. 25, 2023 as a concise explanation of the relevance submitted herewith.

Rockwell Automation, "Kinetix 5700 iTRAK Power Supply and iTRAK Bus Conditioner Installation", (2198 T-INOO1 B-JA-P), Oct. 2017, total 6 pages; with the translation of the JP Office Action dated Sep. 25, 2023 as a concise explanation of the relevance submitted herewith.

* cited by examiner

CONVEYANCE DEVICE

CROSS-REFERENCE TO RELATED APPLICATION

This application is a National Stage of International Patent Application No. PCT/JP2019/049310, filed Dec. 17, 2019, the entire content of which is incorporated herein by reference.

BACKGROUND

Technical Field

The present disclosure relates to a conveyance device, and more particularly, it relates to a conveyance device including a plurality of conveyance modules to convey a slider.

Background Art

Conventionally, a conveyance device including a plurality of conveyance modules to convey a slider is known. Such a conveyance device is disclosed in International Publication No. 2018/055720, for example.

International Publication No. 2018/055720 discloses a conveyance device including a plurality of conveyance modules to convey a slider. In the conveyance device described in International Publication No. 2018/055720, the plurality of conveyance modules are connected to each other to form a conveyance path.

SUMMARY

In the conveyance device described in International Publication No. 2018/055720, the plurality of conveyance modules are connected to each other to form a conveyance path, and thus it is difficult to identify which conveyance module an abnormality has occurred in when the abnormality has occurred in any of the conveyance modules, for example. Therefore, in the conveyance device including the plurality of conveyance modules, it is desired to easily identify a location at which an abnormality or the like has occurred when the abnormality or the like has occurred.

Accordingly, the present disclosure provides a conveyance device capable of easily identifying a location at which an abnormality or the like has occurred when the abnormality or the like has occurred in the conveyance device including a plurality of conveyance modules.

A conveyance device according to an aspect of the present disclosure includes a slider, a conveyor including a plurality of conveyance modules to convey the slider, and a connecting member provided separately from the conveyance modules and configured to connect the conveyance modules adjacent to each other such that a signal is transmittable. The conveyance device further includes a first indicator provided so as to correspond to each of the plurality of conveyance modules and configured to indicate states of the conveyance modules.

In the conveyance device according to this aspect of the present disclosure, as described above, the first indicator is provided in each of the plurality of conveyance modules to indicate the states of the conveyance modules. Accordingly, when an abnormality or the like occurs, the first indicator provided in each of the conveyance modules can notify an operator of the abnormality or the like, and thus it is possible to easily determine which of the conveyance modules has an abnormality or the like. Consequently, when an abnormality or the like occurs in the conveyance device including the plurality of conveyance modules, a location at which the abnormality or the like occurs can be easily identified.

In the aforementioned conveyance device according to this aspect, the first indicator is preferably arranged on a portion of one of side surfaces of each of the conveyance modules extending along a conveyance direction of the slider. Accordingly, the first indicator can be easily checked from the sides of the conveyance modules.

In this case, the conveyance device preferably further includes a second indicator provided in the connecting member to indicate the state of each of the conveyance modules, the second indicator being arranged on a portion of another of the side surfaces of each of the conveyance modules extending along the conveyance direction of the slider. Accordingly, the first indicator can be checked from one side of each of the conveyance modules, and the second indicator can be checked from another side of each of the conveyance modules, and thus the states of the conveyance modules can be checked from both sides of the conveyance modules.

In the aforementioned configuration including the second indicator, the connecting member preferably includes an inclined surface inclined downward and outward from the conveyance modules, and the second indicator is preferably arranged on the inclined surface. Accordingly, the second indicator arranged on the inclined surface can be easily checked from diagonally above, and thus the states of the conveyance modules can be easily checked.

In the aforementioned configuration including the second indicator, the second indicator preferably includes a pair of second indicators provided in the connecting member so as to correspond to both of the conveyance modules adjacent to each other, which the connecting member connects. Accordingly, at a connecting portion of the adjacent conveyance modules, the states of both of the adjacent conveyance modules can be checked.

In this case, one of the pair of second indicators is preferably configured to indicate a state of one of the conveyance modules adjacent to each other and is preferably arranged in a portion of the connecting member on one conveyance module side, and the other of the pair of second indicators is preferably configured to indicate a state of the other of the conveyance modules adjacent to each other and is preferably arranged in a portion of the connecting member on the other conveyance module side. Accordingly, at the connecting portion of the adjacent conveyance modules, it is possible to easily determine which of the adjacent conveyance modules has an abnormality or the like.

In the aforementioned configuration including the second indicator, the first indicator and the second indicator each preferably include an indicator to indicate the states of the conveyance modules by lighting, blinking, or a color of light. Accordingly, the color of the light, the lighting pattern, the blinking pattern, or the like is changed according to the states of the conveyance modules and is indicated on the indicator such that the states of the conveyance modules can be easily checked.

In the aforementioned conveyance device according to this aspect, the conveyance modules each preferably include a module main body, a linear motor provided in the module main body, a control board provided in the module main body to control driving of the linear motor, a motor power supply board configured to supply electric power to the linear motor, a first wire configured to supply electric power to the control board, and a second wire configured to supply electric power to the motor power supply board, and the control board, the motor power supply board, the first wire, and the second wire are preferably built in the module main body. Accordingly, the first wire configured to supply electric power to the control board and the second wire configured to supply electric power to the motor power supply board can be separated and built in the module main body, and thus the first wire and the second wire can be provided according to the required electric power of the control board and the motor power supply board.

In this case, the conveyance modules each preferably further include a plurality of electrically parallel first terminals to which the first wire is connected, the plurality of electrically parallel first terminals being arranged on side surface portions of the module main body at different positions along a conveyance direction of the slider. Accordingly, the polarities of the inputs and outputs of the plurality of first terminals can be eliminated, and thus any first terminal can be used as an input terminal and the other first terminal can be used as an output terminal. Thus, the degree of freedom in arranging the wire connected to the first terminals can be improved, and thus it is possible to significantly reduce or prevent an increase in the length of the wire connected to the first terminals.

In the aforementioned configuration including the conveyance modules each including the first terminals, the second wire preferably includes a plurality of second wires provided independently of each other in the conveyance modules, and the conveyance modules each preferably further include a plurality of electrically parallel second terminals to which the second wire is connected, the plurality of electrically parallel second terminals being arranged on side surface portions of the module main body at different positions along the conveyance direction of the slider. Accordingly, even when the conveyance modules are lengthened, electric power can be supplied to the plurality of second wires according to the length. Furthermore, the polarities of the inputs and outputs of the plurality of second terminals can be eliminated, and thus any second terminal can be used as an input terminal, and the other second terminal can be used as an output terminal. Thus, the degree of freedom in arranging the wire connected to the second terminals can be improved, and thus it is possible to significantly reduce or prevent an increase in the length of the wire connected to the second terminals.

In this case, the conveyance device preferably further includes a coupling member to position and couple the conveyance modules adjacent to each other, and a first electric wire connected to the first terminals to supply electric power to the control board, a second electric wire connected to the second terminals to supply electric power to the motor power supply board, the connecting member, and the coupling member are preferably attachable to and detachable from the conveyance modules independently of each other. Accordingly, the first electric wire, the second electric wire, or the connecting member is attachable and detachable independently of the coupling member that positions each of the adjacent conveyance modules, and thus it is not necessary to remove the coupling member when the first electric wire, the second electric wire, or the connecting member is replaced. Thus, it is not necessary to reposition the conveyance modules once positioned.

In the aforementioned conveyance device according to this aspect, the connecting member preferably includes an electric wire to transmit a signal or a substrate having an electrical pathway to transmit a signal. Accordingly, the configuration of the connecting member can be simplified, and thus the probability of failure can be significantly reduced. Consequently, maintenance of the connecting member can be easily performed.

According to the present disclosure, as described above, it is possible to easily identify the location at which the abnormality or the like has occurred when the abnormality or the like has occurred in the conveyance device including the plurality of conveyance modules.

DETAILED DESCRIPTION

An embodiment embodying the present disclosure is hereinafter described on the basis of the drawings.

The configuration of a conveyance device 100 according to the embodiment of the present disclosure is now described with reference to FIGS. 1 to 5

Configuration of Conveyance Device

The conveyance device 100 according to this embodiment conveys an object to be conveyed placed on a slider 30 along conveyors 1 and 2. Operations are performed on the object to be conveyed by the conveyance device 100 at a plurality of conveyance positions. A robot or an operator performs operations on the object to be conveyed.

Figure 1:
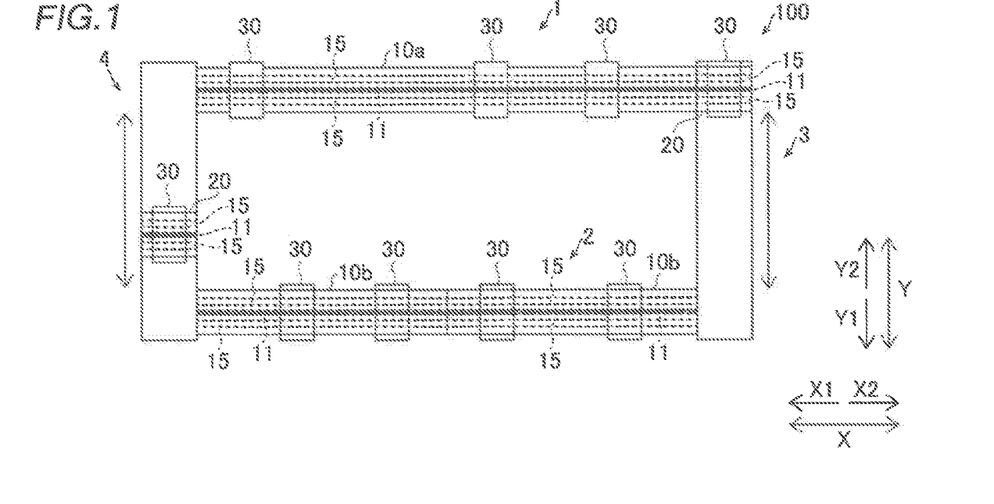
FIG. 1 is a plan view showing a conveyance device according to an embodiment of the present disclosure.
Figure 2:
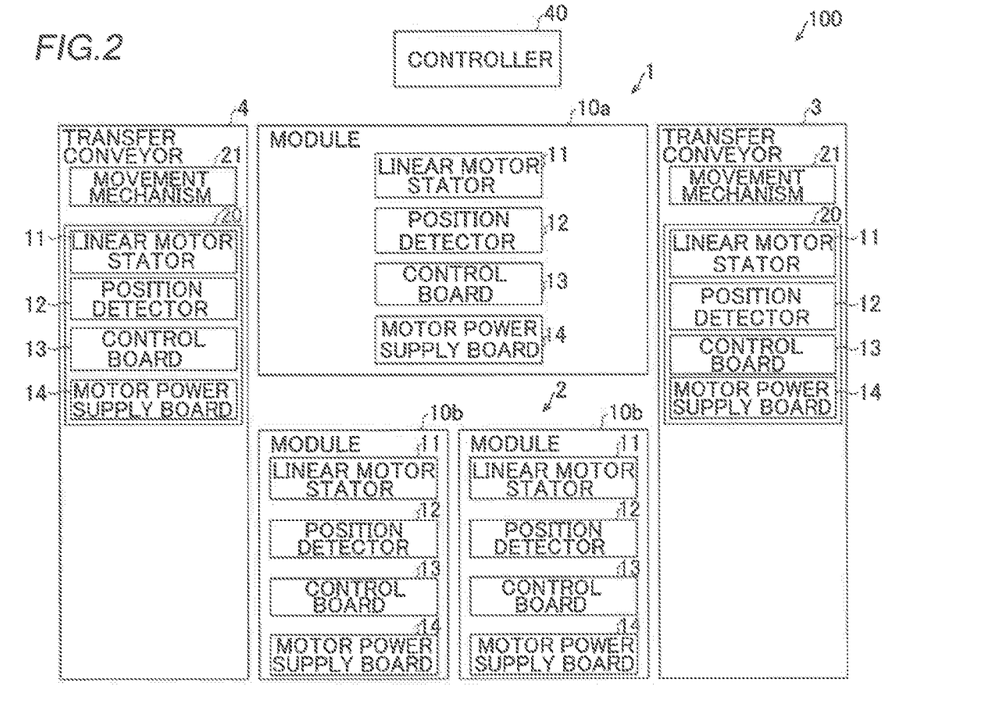
FIG. 2 is a block diagram showing the overall configuration of the conveyance device according to the embodiment of the present disclosure.
Figure 3:
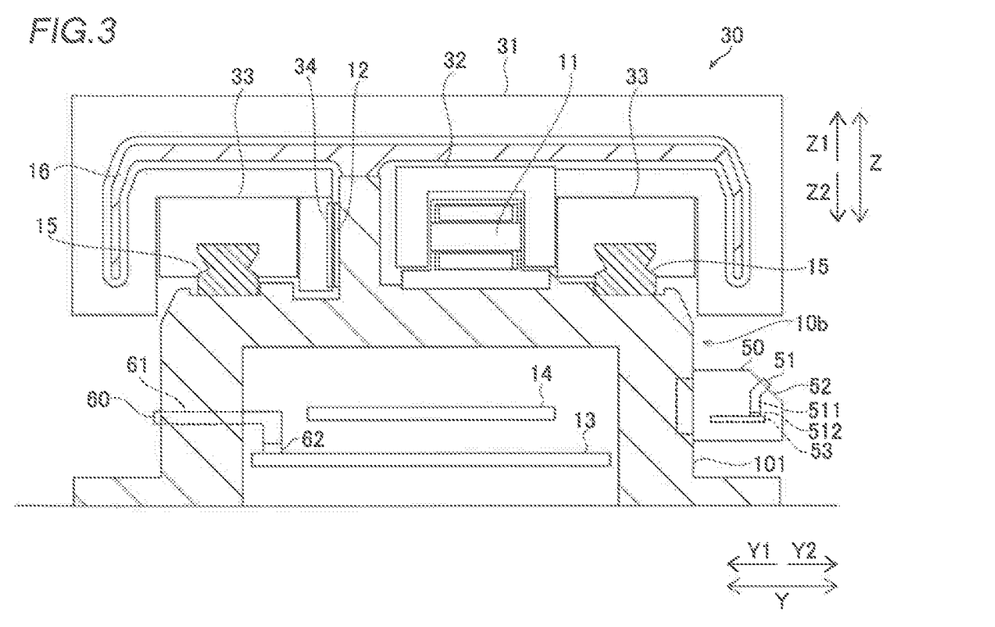
FIG. 3 is a sectional view showing a conveyor and a slider of the conveyance device according to the embodiment of the present disclosure.
Figure 4:
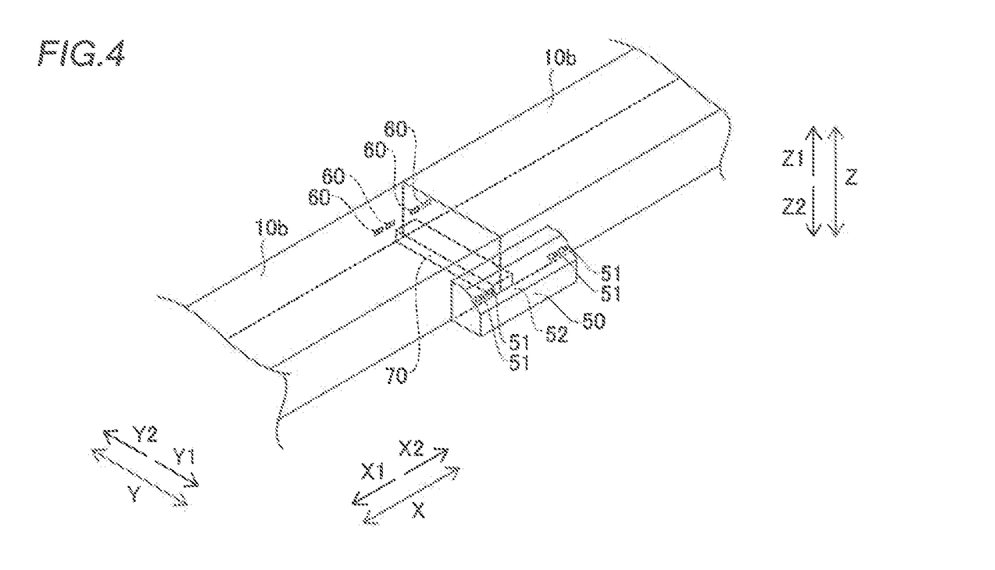
FIG. 4 is a perspective view showing first indicators and second indicators of the conveyance device according to the embodiment of the present disclosure.
Figure 5:
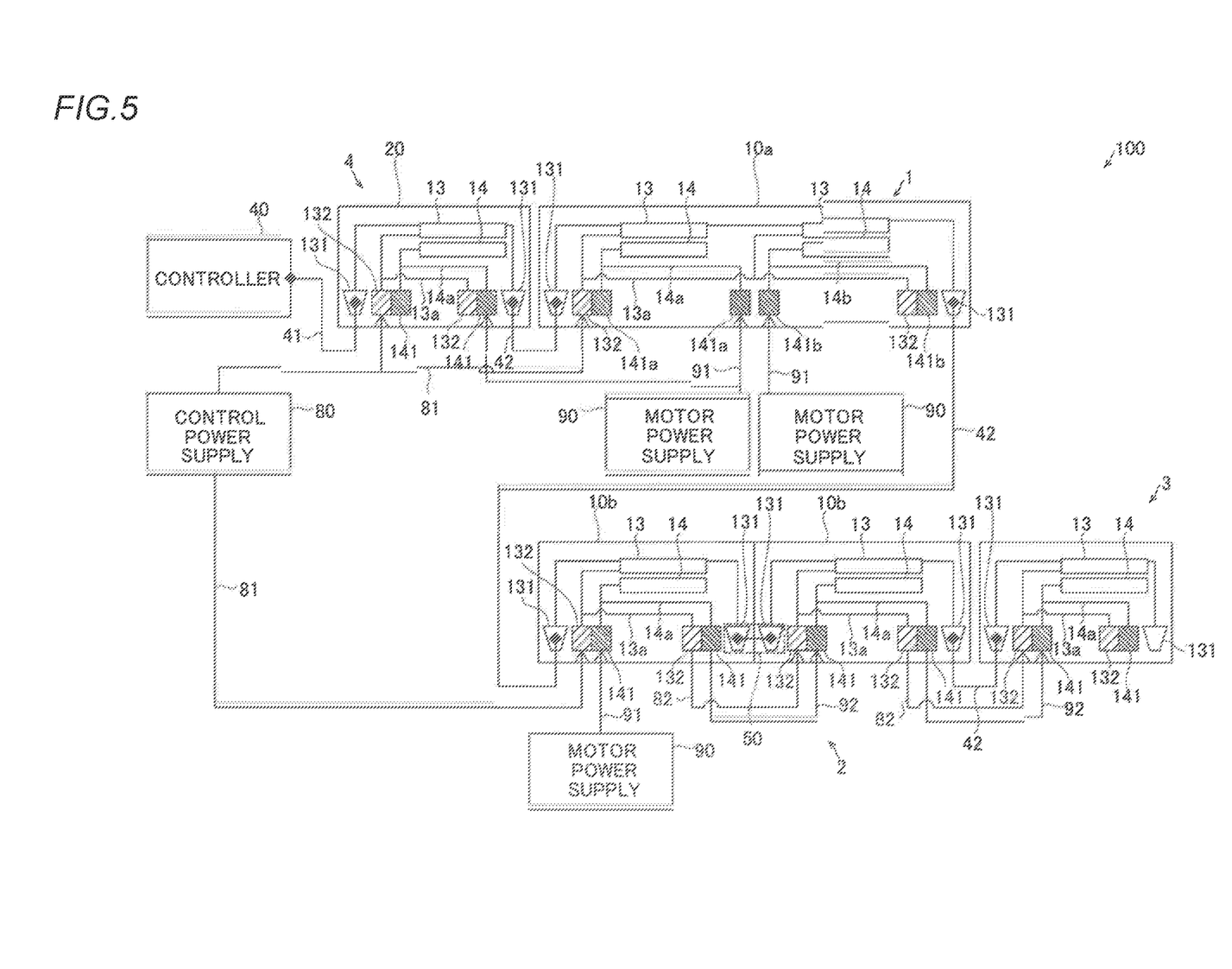
FIG. 5 is a diagram illustrating the wiring of the conveyance device according to the embodiment of the present disclosure.

As shown in FIG. 1, the conveyance device 100 includes the conveyor 1, the conveyor 2, a transfer conveyor 3, a transfer conveyor 4, and the slider 30. Furthermore, as shown in FIG. 2, the conveyance device 100 includes a controller 40. The conveyance device 100 also includes a connecting member 50, as shown in FIGS. 3 and 4. The conveyance device 100 includes first indicators 60, as shown in FIGS. 3 and 4. As shown in FIG. 5, the conveyance device 100 also includes a control power supply 80 and a motor power supply 90.

The conveyor 1 includes a conveyance module 10a. The conveyor 2 includes a plurality of (two) conveyance modules 10b. The plurality of conveyance modules 10b are connected in series to each other, and a conveyance path for the slider 30 is formed therein. The slider 30 is conveyed on the conveyors 1 and 2 in an X direction, and is conveyed from the conveyor 1 (2) to the conveyor 2 (1) in a Y direction by the transfer conveyors 3 and 4. That is, the slider 30 is conveyed and circulated in the order of the conveyor 1, the transfer conveyor 3, the conveyor 2, and the transfer conveyor 4. The conveyance module 10a is longer in the X direction than the conveyance modules 10b. That is, the conveyance module 10a is elongated.

As shown in FIG. 2, the conveyance module 10a (10b) includes a linear motor stator 11, a position detector 12, a control board 13, and a motor power supply board 14.

Furthermore, the conveyance module 10a (10b) includes guide rails 15, as shown in FIGS. 1 and 3. Moreover, the conveyance module 10a (10b) includes a cover 16. The conveyance module 10a (10b) also includes a module main body 101. The linear motor stator 11 is an example of a "linear motor" in the claims.

As shown in FIG. 2, the transfer conveyors 3 and 4 each include a conveyance mechanism 20 that conveys the slider 30 in the X direction and a movement mechanism 21 that moves the conveyance mechanism 20 in the Y direction. The conveyance mechanism 20 includes a linear motor stator 11, a position detector 12, a control board 13, and a motor power supply board 14. The movement mechanism 21 includes guide rails and a ball screw mechanism.

As shown in FIG. 3, the slider 30 includes a slider main body 31, a linear motor mover 32, guide blocks 33, and a magnetic scale 34. A plurality of sliders 30 are provided. The plurality of sliders 30 move independently on the conveyors 1 and 2 and the transfer conveyors 3 and 4.

The conveyors 1 and 2 are provided substantially parallel to each other. The conveyor 1 conveys the slider 30 in an X2 direction, and the conveyor 2 conveys the slider 30 in an X1 direction. The conveyors 1 and 2 are fixed onto a platform. That is, the linear motor stators 11 and the guide rails 15 of the conveyors 1 and 2 are fixedly provided.

The transfer conveyor 3 is arranged adjacent on the X2 direction sides of the conveyors 1 and 2. The transfer conveyor 4 is arranged adjacent on the X1 direction sides of the conveyors 1 and 2. The transfer conveyors 3 and 4 move the guide rails 15 and the linear motor stators 11 in the Y direction with the movement mechanisms 21. The transfer conveyors 3 and 4 are provided to convey the slider 30 from the conveyor 1 (2) to the conveyor 2 (1).

As shown in FIG. 3, the linear motor stators 11 of the conveyors 1 and 2 are provided in the module main bodies 101. The linear motor stators 11 of the transfer conveyors 3 and 4 are provided on the conveyance mechanisms 20 that are moved by the movement mechanisms 21. Note that the transfer conveyors 3 and 4 and the conveyors 1 and 2 may differ only in length, for example. In this case, the linear motor stators 11 of the transfer conveyors 3 and 4 may be provided in module main bodies 101, similarly to the conveyors 1 and 2.

The linear motor stators 11, the position detectors 12, the control boards 13, and the motor power supply boards 14 of the conveyors 1 and 2 and the transfer conveyors 3 and 4 have the same or similar configurations, and thus they are explained together. The linear motor stators 11 each include an electromagnet, and driving electric power (current) is supplied to the electromagnet such that the slider 30 is moved. The linear motor stators 11 are arranged along the conveyance directions (X direction) of the conveyors 1 and 2. As shown in FIG. 3, the cores of the electromagnets of the linear motor stators 11 extend along the Y direction.

The position detectors 12 face the magnetic scale 34 provided on the slider 30 in the Y direction. The position detectors 12 detect the magnetism of the magnetic scale 34 to detect the position of the slider 30. The position of the slider 30 detected by the position detectors 12 is used for feedback control of movement of the slider 30.

The control boards 13 are provided in the module main bodies 101, and control driving of the linear motor stators 11. Specifically, the control boards 13 control electric power (current) supplied to the linear motor stators 11 via the motor power supply boards 14 based on a control signal from the controller 40. As shown in FIG. 5, the control boards 13 are able to transmit and receive signals to and from the controller 40 via terminals 131, a wire 41, and wires 42. Furthermore, electric power is supplied from the control power supply 80 to the control boards 13 via first wires 13a, first terminals 132, and first electric wires 81 and 82. That is, the first wires 13a supply electric power to the control boards 13.

The motor power supply boards 14 supply electric power to the linear motor stators 11. As shown in FIG. 5, electric power is supplied from the motor power supply 90 to the motor power supply boards 14 via second wires 14a and 14b, second terminals 141, 141a, and 141b, and second electric wires 91 and 92. That is, the second electric wires 91 and 92 supply electric power to the motor power supply boards 14.

The guide rails 15 extend along the slider 30 conveyance direction (X direction) of the conveyors 1 and 2. A pair of guide rails 15 are provided parallel to each other in the Y direction. The guide blocks 33 of the sliders 30 engage with the guide rails 14 so as to be movable in the X direction.

The covers 16 are provided to cover upper portions of the linear motor stators 11, the position detectors 12, and the guide rails 15. That is, the covers 16 are provided such that the upper portions of the linear motor stators 11, the position detectors 12, and the guide rails 15 are not exposed even when the slider 30 is not provided.

In this embodiment, the control boards 13, the motor power supply boards 14, the first wires 13a, and the second wires 14a (14b) are built in the module main bodies 101. Specifically, as shown in FIG. 3, the control boards 13, the motor power supply boards 14, the first wires 13a, and the second wires 14a (14b) are arranged in spaces between the module main bodies 101 and the platform. That is, the control boards 13, the motor power supply boards 14, the first wires 13a, and the second wires 14a (14b) are arranged below the linear motor stators 11, the position detectors 12, and the guide rails 15. Thus, it is possible to incorporate the first wires 13a and the second wires 14a (14b) along the laid conveyance modules 10a and 10b. Furthermore, it is possible to draw only electric power required in the conveyance modules 10a and 10b. The conveyance modules 10a and 10b themselves are used as an electric power path such that it is possible to minimize the lengths of electric wires from an external system to the conveyance modules 10a and 10b. The electric wires outside the conveyance modules 10a and 10b can be shortened, and thus it is possible to reduce the influence of disturbance such as external noise.

The object to be conveyed is placed on the slider main body 31. As shown in FIG. 3, the slider main body 31 is provided to surround the covers 16 of the conveyors 1 and 2 as viewed in the conveyance direction (X direction). The linear motor mover 32, the guide blocks 33, and the magnetic scale 34 are attached to the slider main body 31.

The linear motor mover 32 is provided to sandwich the linear motor stator 11 in the Y direction. The linear motor mover 32 includes a plurality of permanent magnets arranged along the conveyance direction (X direction).

The guide blocks 33 are guided by the guide rails 15 and slide. The guide blocks 33 each include a plurality of balls that move and circulate along the moving direction.

The magnetic scale 34 is magnetized in a predetermined pattern along the conveyance direction (X direction).

The controller 40 controls each portion of the conveyance device 100. The controller 40 controls electric power supplied to the linear motor stators 11 of the conveyance device 100 to control movement of the slider 30. Furthermore, the controller 40 controls driving of the movement mechanisms 21 of the transfer conveyors 3 and 4 to control movement of the conveyance mechanisms 20. The controller 40 includes a CPU (central processing unit), a memory, etc.

The connecting member 50 connects the adjacent conveyance modules 10a and 10b such that a signal is transmittable. Specifically, as shown in FIG. 5, the connecting member 50 connects the terminals 131 of the adjacent conveyance modules 10b to each other. The connecting member 50 can be inserted into the terminals 131, and connected to the terminals 131. Furthermore, the wires 41 and 42 can be connected to the terminals 131. The connecting member 50 is provided separately from the conveyance modules 10a and 10b.

In this embodiment, as shown in FIGS. 3 and 4, the first indicators 60 are provided in each of a plurality of conveyance modules 10a and 10b. Furthermore, the first indicators 60 indicate the states of the conveyance modules 10a and 10b. The first indicators 60 are arranged on portions of one (Y2 direction side surface) of the side surfaces of each of the conveyance modules 10a and 10b extending along the conveyance direction (X direction) of the slider 30.

As shown in FIGS. 3 and 4, the connecting member 50 includes second indicators 51 that indicate the state of each of the conveyance modules 10a and 10b. The second indicators 51 are arranged on portions of another (Y1 direction side surface) of the side surfaces of each of the conveyance modules 10a and 10b extending along the conveyance direction (X direction) of the slider 30. That is, the second indicators 51 are arranged on the side surface portions of the conveyance modules 10a and 10b opposite to the first indicators 60 in the Y direction.

The connecting member 50 includes an inclined surface 52 that is inclined downward and outward (toward the Y1 direction side) from the conveyance modules 10a and 10b. The second indicators 51 are arranged on the inclined surface 52.

As shown in FIG. 3, the connecting member 50 includes a substrate 53 having an electrical pathway to transmit a signal. The substrate 53 is connected to be able to communicate a control signal between the conveyance modules 10a and 10b and the transfer conveyors 3 and 4. The substrate 53 includes a light source 512 (an LED, for example). Light emitted from the light source 512 is guided to the second indicators 51 by a light guide 511. The substrate 53 is built in the connecting member 50. Furthermore, the substrate 53 is formed with only a circuit for communication and the light source 512.

As shown in FIG. 4, a pair (two sets) of second indicators 51 are provided on the connecting member 50 so as to correspond to both of the adjacent conveyance modules 10a and 10b that the connecting member 50 connects. Furthermore, one of the pair (two sets) of second indicators 51 indicates the state of one of the adjacent conveyance modules 10a and 10b. Furthermore, one of the pair (two sets) of second indicators 51 is arranged in a portion of the connecting member 50 on one conveyance module side. The other of the pair (two sets) of second indicators 51 indicates the state of the other of the adjacent conveyance modules 10a and 10b. Furthermore, the other of the pair (two sets) of second indicators 51 is arranged in a portion of the connecting member 50 on the other conveyance module side.

The first indicators 60 and the second indicators 51 each include an indicator to indicate the state of the conveyance module 10a or 10b by lighting, blinking, or the color of light. Furthermore, two first indicators 60 (second indicators 51) are provided for each set. The first indicators 60 (second indicators 51) include an indicator to indicate the state of a power supply of the conveyance modules 10a and 10b, and an indicator to indicate the control status. The first indicators 60 (second indicators 51) indicate the states of the conveyance modules 10a and 10b by the lighting state (turning off, lighting, or blinking) of the light and the color (such as green, yellow, or red) of the light. Furthermore, the first indicators 60 (second indicators 51) indicate the states of the conveyance modules 10a and 10b such as states in which the conveyance modules 10a and 10b are normal, states in which an error has occurred in the conveyance modules 10a and 10b, states in preparation, or states in which the preparation is completed. The first indicators 60 (second indicators 51) also indicate whether the slider is in a control (operation) state when the conveyance device 100 is normal. The first indicators 60 (second indicators 51) also indicate the states of the conveyance modules 10a and 10b such as states in which the servo is off, the motor power supply is off, and the operation is being prepared, or states in which the servo is off and the operation preparation is completed.

As shown in FIG. 5, the conveyance modules 10a and 10b and the conveyance mechanisms 20 include a plurality of electrically parallel first terminals 132 to which the first wires 13a are connected and that are arranged on side surface portions of the module main bodies 101 at different positions along the conveyance direction (X direction) of the slider 30. Specifically, the conveyance modules 10a and 10b and the conveyance mechanisms 20 include the first terminals 132 in both the vicinity of one end and the vicinity of the other end in the conveyance direction (X direction). The two first terminals 132 have no polarity, and thus either of them may be used as an input terminal. Furthermore, the one not used as the input terminal can be used as an output terminal.

The elongated conveyance module 10a includes two control boards 13 and two motor power supply boards 14. The two control boards 13 of the conveyance module 10a are connected to communicate a signal. Furthermore, electric power is supplied from the common first terminals 132 to the two control boards 13.

Electric power is supplied from the second wires 14a and 14b provided independently of each other to the two motor power supply boards 14 of the conveyance module 10a. A plurality of electrically parallel second terminals 141a arranged on side surface portions of the module main body 101 at different positions along the conveyance direction (X direction) of the slider 30 are connected to the second wire 14a. A plurality of electrically parallel second terminals 141b arranged on side surface portions of the module main body 101 at different positions along the conveyance direction (X direction) of the slider 30 are connected to the second wire 14b.

The plurality of second terminals 141a and the plurality of second terminals 141b are prepared for the elongated conveyance module 10a such that it is possible to cope with a case in which the slider 30 runs densely and a case in which a plurality of power supplies are required for the conveyance module 10a. Thus, it is possible to solve the shortage of power supply capacity. On the other hand, when a large amount of electric power is not required, driving is enabled by connecting the second terminals 141a and 141b with an electric wire. Thus, it is possible to save wiring.

The conveyance modules 10b and the conveyance mechanisms 20 include one control board 13 and one motor power supply board 14. Electric power is supplied from the common first terminals 132 to the control boards 13 via the first wires 13a. Electric power is supplied from the common second terminals 141 to the motor power supply boards 14 via the second wires 14a.

The controller 40 is connected to the control boards 13 of the conveyance modules 10a and 10b and the conveyance mechanisms 20 by the wire 41 and the wires 42 capable of communicating a control signal. Specifically, the controller 40 is connected to one terminal 131 of the conveyance mechanism 20 of the transfer conveyor 4 by the wire 41. The other terminal 131 of the conveyance mechanism 20 of the transfer conveyor 4 is connected to one terminal 131 of the conveyance module 10a by the wire 42. The other terminal 131 of the conveyance module 10a is connected to one terminal 131 of one conveyance module 10b of the conveyor 2 by the wire 42. The other terminal 131 of one conveyance module 10b of the conveyor 2 is connected to one terminal 131 of the other conveyance module 10b of the conveyor 2 by the connecting member 50. The other terminal 131 of the other conveyance module 10b of the conveyor 2 is connected to one terminal 131 of the conveyance mechanism 20 of the transfer conveyor 3 by the wire 42.

One control power supply 80 is provided to supply electric power to the control board(s) 13 of each of the conveyance modules 10a and 10b and the conveyance mechanisms 20. The control power supply 80 is connected to one first terminal 132 of the conveyance mechanism 20 of the transfer conveyor 4 by the first electric wire 81. Furthermore, the control power supply 80 is connected to one first terminal 132 of the conveyance module 10a by the first electric wire 81. The control power supply 80 is also connected to one first terminal 132 of one conveyance module 10b of the conveyor 2 by the first electric wire 81. The other first terminal 132 of one conveyance module 10b of the conveyor 2 is connected to one first terminal 132 of the other conveyance module 10b of the conveyor 2 by the first electric wire 82. The other first terminal 132 of the other conveyance module 10b of the conveyor 2 is connected to one first terminal 132 of the conveyance mechanism 20 of the transfer conveyor 3 by the first electric wire 82.

Three motor power supplies 90 are provided to supply electric power to the motor power supply board(s) 14 of each of the conveyance modules 10a and 10b and the conveyance mechanisms 20. One motor power supply 90 is connected to the other second terminal 141 of the conveyance mechanism 20 of the transfer conveyor 4 by the second electric wire 91. Furthermore, one motor power supply 90 is connected to the other second terminal 141a of the conveyance module 10a by the second electric wire 91. Another motor power supply 90 is connected to one second terminal 141b of the conveyance module 10a by the second electric wire 91. The other motor power supply 90 is connected to one second terminal 141 of one conveyance module 10b of the conveyor 2 by the second electric wire 91. The other second terminal 141 of one conveyance module 10b of the conveyor 2 is connected to one second terminal 141 of the other conveyance module 10b of the conveyor 2 by the second electric wire 92. The other second terminal 141 of the other conveyance module 10b of the conveyor 2 is connected to one second terminal 141 of the conveyance mechanism 20 of the transfer conveyor 3 by the second electric wire 92.

As shown in FIG. 4, a coupling member 70 is provided independently of the connecting member 50, and positions and couples the adjacent conveyance modules 10b (10a). Specifically, the coupling member 70 is fixed onto the platform on which the conveyance device 100 is installed while being positioned. The coupling member 70 is arranged at the coupling position of the conveyance modules 10b (10a), the end position on the transfer conveyor 3 side, and the end position on the transfer conveyor 4 side. Thus, even when the conveyance modules 10b (10a) are removed from the platform for maintenance, for example, the coupling members 70 fixed to the platform remain. Therefore, the conveyance modules 10b (10a) can be mounted on the platform while being positioned by the coupling members 70 again.

The coupling member 70 that positions and couples the adjacent conveyance modules 10b (10a), the first electric wires 81 and 82 connected to the first terminals 132 to supply electric power to the control boards 13, the second electric wires 91 and 92 connected to the second terminals 141, 141a, and 141b to supply electric power to the motor power supply boards 14, and the connecting member 50 are attachable to and detachable from the conveyance modules 10a and 10b independently of each other.

Advantageous Effects of This Embodiment

According to this embodiment, the following advantageous effects are achieved.

According to this embodiment, as described above, the first indicators 60 are provided in each of a plurality of conveyance modules 10a and 10b to indicate the states of the conveyance modules 10a and 10b. Accordingly, when an abnormality or the like occurs in the conveyance module 10a, the first indicators 60 provided in the conveyance module 10a can notify the operator of the abnormality or the like, and when an abnormality or the like occurs in the conveyance modules 10b, the first indicators 60 provided in the conveyance modules 10b can notify the operator of the abnormality or the like, and thus it is possible to easily determine which of the conveyance modules 10a and 10b has an abnormality or the like. Consequently, when an abnormality or the like occurs in the conveyance device including the plurality of conveyance modules 10a and 10b, a location at which the abnormality or the like occurs can be easily identified.

According to this embodiment, as described above, the first indicators 60 are arranged on the portions of one (Y2 direction side surface) of the side surfaces of each of the conveyance modules 10a and 10b extending along the conveyance direction (X direction) of the slider 30. Accordingly, the first indicators 60 can be easily checked from the sides of the conveyance modules 10a and 10b.

According to this embodiment, as described above, the second indicators 51 configured to indicate the state of each of the conveyance modules 10a and 10b are arranged on the portion of another (Y1 direction side surface) of the side surfaces of each of the conveyance modules 10a and 10b extending along the conveyance direction (X direction) of the slider 30. Accordingly, the first indicators 60 can be checked from one side of each of the conveyance modules 10a and 10b, and the second indicators 51 can be checked from another side of each of the conveyance modules 10a and 10b, and thus the states of the conveyance modules 10a and 10b can be checked from both sides of the conveyance modules 10a and 10b.

According to this embodiment, as described above, the connecting member 50 includes the inclined surface 52 that is inclined downward and outward from the conveyance modules 10a and 10b, and the second indicators 51 are arranged on the inclined surface 52. Accordingly, the second indicators 51 arranged on the inclined surface can be easily checked from diagonally above, and thus the states of the conveyance modules 10a and 10b can be easily checked.

According to this embodiment, as described above, the pair of second indicators 51 are provided in the connecting member 50 so as to correspond to both of the adjacent conveyance modules 10a and 10b that the connecting member 50 connects. Accordingly, at a connecting portion of the adjacent conveyance modules 10a and 10b, the states of both of the adjacent conveyance modules can be checked.

According to this embodiment, as described above, one of the pair of second indicators 51 indicates the state of one of the adjacent conveyance modules 10a and 10b and is arranged in the portion of the connecting member 50 on one conveyance module side, and the other of the pair of second indicators 51 indicates the state of the other of the adjacent conveyance modules 10a and 10b and is arranged in the portion of the connecting member 50 on the other conveyance module side. Accordingly, at the connecting portion of the adjacent conveyance modules 10a and 10b, it is possible to easily determine which of the adjacent conveyance modules has an abnormality or the like.

According to this embodiment, as described above, the first indicators 60 and the second indicators 51 each include an indicator to indicate the state of the conveyance module 10a or 10b by lighting, blinking, or the color of light. Accordingly, the color of the light, the lighting pattern, the blinking pattern, or the like is changed according to the states of the conveyance modules 10a and 10b and is indicated on the indicator such that the states of the conveyance modules 10a and 10b can be easily checked.

According to this embodiment, as described above, the control boards 13 provided in the module main bodies 101 to control driving of the linear motors, the motor power supply boards 14 configured to supply electric power to the linear motors, the first wires 13a configured to supply electric power to the control boards 13, and the second wires 14a and 14b configured to supply electric power to the motor power supply boards 14 are built in the module main bodies 101. Accordingly, the first wires 13a configured to supply electric power to the control boards 13 and the second wires 14a and 14b configured to supply electric power to the motor power supply boards 14 can be separated and built in the module main bodies 101, and thus the first wires 13a and the second wires 14a and 14b can be provided according to the required electric power of the control boards 13 and the motor power supply boards 14.

According to this embodiment, as described above, the plurality of electrically parallel first terminals 132 to which the first wires 13a are connected and that are arranged on the side surface portions of the module main bodies 101 at the different positions along the conveyance direction (X direction) of the slider 30 are provided in the conveyance modules 10a and 10b. Accordingly, the polarities of the inputs and outputs of the plurality of first terminals 132 can be eliminated, and thus any first terminal 132 can be used as an input terminal and the other first terminal 132 can be used as an output terminal. Thus, the degree of freedom in arranging the wires connected to the first terminals 132 can be improved, and thus it is possible to significantly reduce or prevent an increase in the lengths of the wires connected to the first terminals 132.

According to this embodiment, as described above, a plurality of second wires 14a and 14b are provided independently of each other in the conveyance module 10a, and the plurality of electrically parallel second terminals 141a and 141b to which the second wires 14a and 14b are connected and that are arranged on the side surface portions of the module main body 101 at the different positions along the conveyance direction (X direction) of the slider 30 are provided in the conveyance module 10a. Accordingly, even when the conveyance module 10a is lengthened, electric power can be supplied to the plurality of second wires 14a and 14b according to the length. Furthermore, the polarities of the inputs and outputs of the plurality of second terminals 141a and 141b can be eliminated, and thus any second terminals 141a and 141b can be used as input terminals, and the other second terminals 141a and 141b can be used as output terminals. Thus, the degree of freedom in arranging the wires connected to the second terminals 141a and 141b can be improved, and thus it is possible to significantly reduce or prevent an increase in the lengths of the wires connected to the second terminals 141a and 141b.

According to this embodiment, as described above, the coupling member 70 that positions and couples the adjacent conveyance modules 10a and 10b, the first electric wires 81 and 82 connected to the first terminals 132 to supply electric power to the control boards 13, the second electric wires 91 and 92 connected to the second terminals 141, 141a, and 141b to supply electric power to the motor power supply boards 14, and the connecting member 50 are attachable to and detachable from the conveyance modules 10a and 10b independently of each other. Accordingly, when the first electric wires 81 and 82, the second electric wires 91 and 92, or the connecting member 50 is replaced, the first electric wires 81 and 82, the second electric wires 91 and 92, or the connecting member 50 is attachable and detachable independently of the coupling member 70 that positions each of the adjacent conveyance modules 10a and 10b, and thus it is not necessary to remove the coupling member 70. Thus, it is not necessary to reposition the conveyance modules 10a and 10b once positioned.

According to this embodiment, as described above, the connecting member 50 includes the substrate 53 having an electrical pathway to transmit a signal. Accordingly, the configuration of the connecting member 50 can be simplified, and thus the probability of failure can be significantly reduced. Consequently, maintenance of the connecting member 50 can be easily performed.

Modified Examples

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

For example, while the example in which one control power supply is provided to supply electric power to the control boards has been shown in the aforementioned embodiment, the present disclosure is not restricted to this. In the present disclosure, a plurality of control power supplies may be provided to supply electric power to the control boards.

While the example in which three motor power supplies are provided to supply electric power to the motor power supply boards has been shown in the aforementioned embodiment, the present disclosure is not restricted to this. In the present disclosure, for example, one, two, or four or more motor power supplies may be provided depending on the lengths of the modules or the number of sliders. Alternatively, one, two, or four or more motor power supplies may be provided according to the rated current of a motor.

While the example in which two electrically parallel first terminals are provided for one first wire has been shown in the aforementioned embodiment, the present disclosure is not restricted to this. In the present disclosure, three or more electrically parallel first terminals may be provided for one first wire.

While the example in which two electrically parallel second terminals are provided for one second wire has been shown in the aforementioned embodiment, the present disclosure is not restricted to this. In the present disclosure, three or more electrically parallel second terminals may be provided for one second wire.

While the example in which two independent second wires are provided for one elongated conveyance module 10a has been shown in the aforementioned embodiment, the present disclosure is not restricted to this. In the present disclosure, three or more independent second wires may be provided for one conveyance module.

While the example in which one first wire is provided for one conveyance module has been shown in the aforementioned embodiment, the present disclosure is not restricted to this. In the present disclosure, two or more independent first wires may be provided for one conveyance module. Alternatively, a plurality of first wires and a plurality of second wires may be independently provided, or either the first wire or the second wire may be independently provided in plurality.

While the example in which the movement mechanisms of the transfer conveyors move the linear motors and the guide rails horizontally has been shown in the aforementioned embodiment, the present disclosure is not restricted to this. In the present disclosure, the movement mechanisms of the transfer conveyors may move the linear motors and the guide rails vertically.

While the example in which the movement mechanisms of the transfer conveyors translate the linear motors and the guide rails has been shown in the aforementioned embodiment, the present disclosure is not restricted to this. In the present disclosure, the movement mechanisms of the transfer conveyors may rotate and move the linear motors and the guide rails.

While the example in which the connecting member includes the substrate having an electrical pathway to transmit a signal has been shown in the aforementioned embodiment, the present disclosure is not restricted to this. In the present disclosure, the connecting member may include an electric wire to transmit a signal. Alternatively, the connecting member may have an electric pathway to transmit a signal other than the substrate and the electric wire.

While the example in which the conveyor 1 includes one conveyance module and the conveyor 2 includes two conveyance modules has been shown in the aforementioned embodiment, the present disclosure is not restricted to this. In the present disclosure, the conveyors may include three or more conveyance modules. Alternatively, a plurality of elongated conveyance modules 10a may be connected in series to each other.

While the example in which the first indicators and the second indicators indicating the states of the conveyance modules are provided in pairs has been shown in the aforementioned embodiment, the present disclosure is not restricted to this. In the present disclosure, a set of one first indicator and a set of one second indicator may be provided, or a set of three or more first indicators and a set of three or more second indicators may be provided.

While the example in which the control boards and the motor power supply boards are provided separately has been shown in the aforementioned embodiment, the present disclosure is not restricted to this. In the present disclosure, the control boards and the motor power supply boards may be boards in which a control circuit and a motor power supply circuit are formed on a common board. In this case, electric power is supplied from the first wire to the control circuit, which corresponds to the control board, and electric power is supplied from the second wire to the motor power supply circuit, which corresponds to the motor power supply board.

While the example in which the second indicators are provided on the inclined surface of the connecting member has been shown in the aforementioned embodiment, the present disclosure is not restricted to this. In the present disclosure, the second indicators may be arranged on the upper surface or the side surface of the connecting member. In order to facilitate checking the second indicators, it is preferable to arrange the second indicators on the inclined surface.

The invention claimed is:

1. A conveyance device comprising:
a slider;
a conveyor including a plurality of conveyance modules configured to convey the slider;
a connector separate from the conveyance modules and configured to connect the conveyance modules adjacent to each other such that a signal is transmittable; and
a first indicator configured to correspond to each of the plurality of conveyance modules and configured to indicate states of the conveyance modules including at least one of states of a power supply of the conveyance modules, states of the conveyance modules being states in which the conveyance modules are normal, states in which an error has occurred in the conveyance modules, states in preparation, and states in which the preparation is completed,
wherein the first indicator is provided on a portion of one of side surfaces of each of the conveyance modules extending along a conveyance direction of the slider; and
the connector is provided on the portions of another of the side surfaces of each of the conveyance modules extending along the conveyance direction of the slider.

2. The conveyance device according to claim 1, wherein the conveyance modules each include a module main body, a linear motor in the module main body, a control board in the module main body to control driving of the linear motor, a motor power supply board configured to supply electric power to the linear motor, a first wire configured to supply electric power to the control board, and a second wire configured to supply electric power to the motor power supply board; and
the control board, the motor power supply board, the first wire, and the second wire are built in the module main body.

3. The conveyance device according to claim 1, wherein the connector includes an electric wire to transmit a signal or a substrate having an electrical pathway to transmit a signal.

4. The conveyance device according to claim 1, wherein the connector includes an electric wire to transmit a signal or a substrate having an electrical pathway to transmit a signal.

5. A conveyance device comprising:
a slider;
a conveyor including a plurality of conveyance modules configured to convey the slider;
a connector separate from the conveyance modules and configured to connect the conveyance modules adjacent to each other such that a signal is transmittable;

a first indicator configured to correspond to each of the plurality of conveyance modules and configured to indicate states of the conveyance modules, the first indicator being on a portion of one of side surfaces of each of the conveyance modules extending along a conveyance direction of the slider; and a second indicator in the connector to indicate the state of each of the conveyance modules, the second indicator being on a portion of another of the side surfaces of each of the conveyance modules extending along the conveyance direction of the slider.

6. The conveyance device according to claim 5, wherein the connector includes an inclined surface inclined downward and outward from the conveyance modules; and the second indicator is on the inclined surface.

7. The conveyance device according to claim 6, wherein the second indicator includes a pair of second indicators in the connector so as to correspond to both of the conveyance modules adjacent to each other, which the connector connects.

8. The conveyance device according to claim 6, wherein the first indicator and the second indicator each include an indicator to indicate the states of the conveyance modules by lighting, blinking, or a color of light.

9. The conveyance device according to claim 6, wherein the conveyance modules each include a module main body, a linear motor in the module main body, a control board in the module main body to control driving of the linear motor, a motor power supply board configured to supply electric power to the linear motor, a first wire configured to supply electric power to the control board, and a second wire configured to supply electric power to the motor power supply board; and the control board, the motor power supply board, the first wire, and the second wire are built in the module main body.

10. The conveyance device according to claim 5, wherein the second indicator includes a pair of second indicators in the connector so as to correspond to both of the conveyance modules adjacent to each other, which the connector connects.

11. The conveyance device according to claim 10, wherein one of the pair of second indicators is configured to indicate a state of one of the conveyance modules adjacent to each other and is in a portion of the connector on one conveyance module side; and the other of the pair of second indicators is configured to indicate a state of the other of the conveyance modules adjacent to each other and is in a portion of the connector on the other conveyance module side.

12. The conveyance device according to claim 11, wherein the first indicator and the second indicator each include an indicator to indicate the states of the conveyance modules by lighting, blinking, or a color of light.

13. The conveyance device according to claim 10, wherein the first indicator and the second indicator each include an indicator to indicate the states of the conveyance modules by lighting, blinking, or a color of light.

14. The conveyance device according to claim 5, wherein the first indicator and the second indicator each include an indicator to indicate the states of the conveyance modules by lighting, blinking, or a color of light.

15. The conveyance device according to claim 5, wherein the conveyance modules each include a module main body, a linear motor in the module main body, a control board in the module main body to control driving of the linear motor, a motor power supply board configured to supply electric power to the linear motor, a first wire configured to supply electric power to the control board, and a second wire configured to supply electric power to the motor power supply board; and the control board, the motor power supply board, the first wire, and the second wire are built in the module main body.

16. The conveyance device according to claim 5, wherein the connector includes an electric wire to transmit a signal or a substrate having an electrical pathway to transmit a signal.

17. A conveyance device comprising:

a slider;

a conveyor including a plurality of conveyance modules configured to convey the slider;

a connector separate from the conveyance modules and configured to connect the conveyance modules adjacent to each other such that a signal is transmittable; and a first indicator configured to correspond to each of the plurality of conveyance modules and configured to indicate states of the conveyance modules, wherein the conveyance modules each include a module main body, a linear motor in the module main body, a control board in the module main body to control driving of the linear motor, a motor power supply board configured to supply electric power to the linear motor, a first wire configured to supply electric power to the control board, a second wire configured to supply electric power to the motor power supply board, and a plurality of electrically parallel first terminals to which the first wire is connected, the plurality of electrically parallel first terminals being on side surface portions of the module main body at different positions along a conveyance direction of the slider, and the control board, the motor power supply board, the first wire, and the second wire are built in the module main body.

18. The conveyance device according to claim 17, wherein the second wire includes a plurality of second wires independent of each other in the conveyance modules; and the conveyance modules each further include a plurality of electrically parallel second terminals to which the second wire is connected, the plurality of electrically parallel second terminals being on side surface portions of the module main body at different positions along the conveyance direction of the slider.

19. The conveyance device according to claim 18, further comprising:

a coupling member to position and couple the conveyance modules adjacent to each other; wherein a first electric wire connected to the first terminals to supply electric power to the control board, a second electric wire connected to the second terminals to supply electric power to the motor power supply board, the connector, and the coupling member are attachable to and detachable from the conveyance modules independently of each other.

* * * * *